United States Patent
Gwon et al.

(10) Patent No.: US 9,665,196 B2
(45) Date of Patent: May 30, 2017

(54) TOUCH SENSOR-INTEGRATED TYPE DISPLAY DEVICE

(71) Applicant: LG DISPLAY CO., LTD., Seoul (KR)

(72) Inventors: Hyangmyoung Gwon, Paju-si (KR); Ahra Cho, Goyang-si (KR); Jaeseung Kim, Goyang-si (KR); Junghoon Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 14/983,257

(22) Filed: Dec. 29, 2015

(65) Prior Publication Data

US 2017/0060310 A1  Mar. 2, 2017

(30) Foreign Application Priority Data

Aug. 31, 2015  (KR) .................. 10-2015-0123250

(51) Int. Cl.
| | |
|---|---|
| *G09G 1/00* | (2006.01) |
| *G06F 3/041* | (2006.01) |
| *G06F 3/047* | (2006.01) |
| *G09G 3/36* | (2006.01) |

(52) U.S. Cl.
CPC ............ *G06F 3/0412* (2013.01); *G06F 3/047* (2013.01); *G06F 3/0416* (2013.01); *G09G 3/3655* (2013.01); *G09G 3/3677* (2013.01); *G09G 3/3688* (2013.01); *G09G 3/3696* (2013.01); *G09G 2300/0426* (2013.01)

(58) Field of Classification Search
CPC .......... G06F 1/00; G06F 3/044; G06F 3/0412; G06F 3/0416; G06F 2203/04103; G09G 1/00; G09G 3/3655
See application file for complete search history.

(56) References Cited

U.S. PATENT DOCUMENTS

2015/0214376 A1* 7/2015 Koezuka ............... G02F 1/1368
257/43

FOREIGN PATENT DOCUMENTS

| KR | 10-2012-0078355 A | 7/2012 |
|---|---|---|
| KR | 10-2015-0011963 A | 2/2015 |
| KR | 10-2015-0070664 A | 6/2015 |

* cited by examiner

*Primary Examiner* — Michael Faragalla
(74) *Attorney, Agent, or Firm* — Birch, Stewart, Kolasch & Birch, LLP

(57) ABSTRACT

Provided is a touch sensor-integrated type display device that includes a plurality of gate lines and data lines disposed to intersect each other; a plurality of pixel electrodes; a plurality of first touch/common electrodes disposed in an active area; a plurality of second touch/common electrodes disposed in a bezel area; a gate driver; a driver IC; and switching elements. The switching elements electrically connect the first touch/common electrodes to the the second touch/common electrodes which are adjacent to each other in response to a control signal.

17 Claims, 8 Drawing Sheets

TOUCH SENSOR-INTEGRATED TYPE DISPLAY DEVICE

CROSS-REFERENCE TO RELATED APPLICATION

This application claims the benefit of priority under 35 U.S.C. §119(a) to Korean Patent Application No. 10-2015-0123250 filed on Aug. 31, 2015, which is incorporated by reference herein in its entirety.

BACKGROUND OF THE INVENTION

Field of the Invention

The present invention relates to a touch sensor-integrated type display device and, more particularly, to a touch sensor-integrated type display device capable of improving touch precision in a corner or edge portion and also achieving a narrow bezel.

Discussion of the Related Art

Recently, various input devices, such as keyboards, mouses, track balls, joysticks, and digitizers, are used to form an interface between a user and home appliances or various information communication devices. It is difficult to increase the completeness of a product because how to use such input devices needs to be known in order to use the input devices and inconvenience is caused due to some space occupied by the input devices. Accordingly, there is an increasing need for an input device which is convenient and simple and can reduce a malfunction. In line with such a need, there has been proposed a touch sensor in which a user inputs information by directly touching a screen with a finger or pen or by bringing a finger or pen to a screen while viewing the display devices of home appliances or various information communication devices.

The touch sensor is applied to various display devices because the touch sensor is simple and has less malfunctions and enables input even without using a separate input device and a user can manipulate the touch sensor rapidly and easily through contents displayed on a screen.

The touch sensor may be classified into an add-on type, an on-cell type, and an integrated type (or in-cell type) depending on its structure. The add-on type is a method of individually fabricating a touch panel in which a display device and a touch sensor have been formed and attaching a touch panel to the upper plate of the display device. The on-cell type is a method of directly forming a touch sensor on a surface of the upper glass substrate of a display device. The integrated type is a method capable of achieving the thinness of a display device and improving durability by embedding a touch sensor in a display device.

The add-on type touch sensor has a structure in which a completed touch panel is mounted on a display device and is problematic in that it has a thick thickness and has low visibility because brightness of a display device is low.

The on-cell type touch sensor has a structure in which a separate touch sensor is formed on the top surface of a display device. The on-cell type touch sensor has a thinner thickness than the add-on type touch sensor, but is problematic in that a total thickness is increased due to a driving electrode layer forming a touch sensor, a sensing electrode layer, and an insulating layer for insulating the driving electrode layer and the sensing electrode layer.

The integrated type touch sensor has been in the spotlight because it can solve the disadvantages of the add-on type touch sensor and the on-cell type touch sensor in that durability and thinness can be obtained. The integrated type touch sensor is classified into an optical type and a capacitance type depending on a method of sensing a touched portion. The capacitance type is classified into a self-capacitance type and a mutual capacitance type.

The self-capacitance type touch sensor adopts a method of forming a plurality of independent patterns in the touch region of a touch sense panel and determining whether a touch is present by measuring a change of capacitance in each independent pattern.

The mutual capacitance type touch sensor adopts a method of forming a matrix by intersecting X-axis electrode lines (e.g., driving electrode lines) and Y-axis electrode lines (e.g., sensing electrode lines) in the touch electrode forming region of a touch sense panel, applying a driving pulse to the X-axis electrode lines, and determining whether a touch is present by sensing a change of a voltage in sensing nodes defined as the crossing of the X-axis electrode lines and the Y-axis electrode lines through the Y-axis electrode lines.

A related art touch sensor-integrated type liquid crystal display device of a self-capacitance type is described below with reference to FIG. 1. FIG. 1 is a schematic plan view showing a related art touch sensor-integrated type liquid crystal display device of a self-capacitance type.

Referring to FIG. 1, the touch sensor-integrated type display device of a self-capacitance type includes an active area AA in which touch electrodes are formed and data is displayed and a bezel area BA disposed on the outside of the active area AA. Various lines, a source driving and touch sensing integrated chip (IC) 10 in which ICs for source driver and ICs for touch controller have been integrated, and an IC 20 for gate driver are formed in the bezel area BA.

The active area AA includes a plurality of touch electrodes Tx11~Tx1$m$, Tx21~Tx2$m$, Tx31~Tx3$m$, . . . , Txn1~Txn$m$ arranged in a first direction (e.g., X-axis direction) and a second direction (e.g., Y-axis direction) which cross each other and a plurality of routing lines TW11~TW1$n$, TW21~TW2$n$, TW31~TW3$n$, . . . , TWn1~TWn$m$ respectively connected to the plurality of touch electrodes Tx11~Tx1$m$, Tx21~Tx2$m$, Tx31~Tx3$m$, . . . , Txn1~Txn$m$ and arranged in parallel in the second direction.

The plurality of touch electrodes Tx11~Tx1$m$, Tx21~Tx2$m$, Tx31~Tx3$m$, . . . , Txn1~Txn$m$ formed in the active area AA are formed by dividing a common electrode of the display device. The touch electrodes operate as the common electrode during a display operation for displaying data and operate as touch electrodes during a touch operation for recognizing touch locations.

The bezel area BA is disposed on the outside of the active area AA and includes the source driving and touch sensing IC 10, the gate driver 20, and various lines. During the touch operation, the source driving and touch sensing IC 10 supplies display data to data lines of the display device depending on driving of gate lines. During the touch operation, the source driving and touch sensing IC 10 supplies a touch driving voltage to the touch electrodes Tx11~Tx1$m$, Tx21~Tx2$m$, Tx31~Tx3$m$, . . . , Txn1~Txn$m$ and determines the location of touch electrodes on which a touch has been performed by scanning changes of capacitance of the touch electrodes before and after the touch. The various lines include the routing lines TW11~TW1$n$, TW21~TW2$n$, TW31~TW3$n$, . . . , TWm1~TWmn connected to the touch electrodes Tx11~Tx1$m$, Tx21~Tx2$m$, Tx31~Tx3$m$, . . . , Txn1~Txn$m$, the data lines connected to the source driving and touch sensing IC 10, and the gate lines connected to the gate driver 20.

In the aforementioned touch sensor-integrated type display device of a self-capacitance type, when a finger or conductive metal, such as a stylus pen, touches the active area AA of the display device, the source driving and touch sensing IC 10 may detect touch locations by recognizing changes of capacitance in the touch electrodes before and after a touch event. That is, the source driving and touch sensing IC 10 may apply a driving pulse to the touch electrodes Tx11~Tx1*m*, Tx21~Tx2*m*, Tx31~Tx3*m*, . . . , Txn1~Txnm formed in the active area AA and may detect a touch location by sensing the touch electrodes Tx11~Tx1*m*, Tx21~Tx2*m*, Tx31~Tx3*m*, . . . , Txn1~Txnm by measuring a change of self-capacitance in each of the touch electrodes before and after the touch event.

The accuracy of touch sensitivity according to a touch location is described below with reference to FIG. 2. FIG. 2 is a plan view showing a touch location in the related art touch sensor-integrated type display device in order to describe the accuracy of touch sensitivity.

The amount of capacitance changed according to each of touch locations "a" to "d" is described with reference to FIG. 2. Each of the touch electrodes Tx11~Tx1*m*, Tx21~Tx2*m*, Tx31~Tx3*m*, . . . , Txn1~Txnm needs to be formed in a very small size because it has to accurately detect a touch location according to a finger or a stylus pen. Accordingly, when a touch is performed on the touch sensor-integrated type display device, only a single touch electrode is not touched, but an adjacent touch electrode(s) may be also touched.

Furthermore, touch sensitivity is increased in proportion to an area touched when a finger or a stylus pen touches the touch electrodes. Accordingly, touch sensitivity is more reduced when a touch is performed at the edge or corner of the active area AA than when a touch is performed within the active area AA.

For example, when four touch electrodes Tx22, Tx23, Tx32, and Tx33 are touched at the touch location "a" within the active area AA of FIG. 2 by a touch event, the amount of capacitance changed about each of the four touch electrodes Tx22, Tx23, Tx32, and Tx33 is accumulated and measured. Accordingly, an accurate touch location can be detected because the amount of changed capacitance is accumulated and calculated based on the area of the four touch electrodes Tx22, Tx23, Tx32, and Tx33.

In contrast, when a touch is performed at the corner of the active area AA of FIG. 2, that is, at the touch location "b" or "c", only two touch electrodes Tx21 and Tx31 or Tx11 and Tx12 may be touched. In this case, the amount of capacitance changed about each of the two touch electrodes Tx21 and Tx31 or Tx11 and Tx12 is accumulated and measured. Accordingly, touch sensitivity is reduced compared to the touch location "a" because the amount of the changed capacitance is accumulated and calculated based on the area of the two touch electrodes Tx21 and Tx31 or Tx11 and Tx12.

Furthermore, when a touch is performed in the corner of the active area AA of FIG. 2, that is, at the touch location "d", only the one touch electrode Tx11 may be touched. In this case, the amount of the changed capacitance about the one touch electrode Tx11 is measured. Accordingly, touch sensitivity is reduced compared to the touch location "b" or the touch location "c" because the amount of the changed capacitance is calculated based on the area of one touch electrode Tx in the corner part.

As described above, the amount of the changed capacitance is reduced as a touch position is moving toward the edge area or corner area of the active area AA because the amount of capacitance according to the touch location is different. Accordingly, there is a need for a solution capable of preventing a reduction of touch accuracy and linearity in the edge area and corner area of an active area.

SUMMARY OF THE INVENTION

An object of the present invention is to provide a touch sensor-integrated type display device which is capable of improving touch accuracy and linearity in the edge area and corner area of an active area, preventing a display failure, and also reducing a bezel area.

To achieve these and other advantages and in accordance with the purpose of the present invention, as embodied and broadly described, a touch sensor-integrated type display device comprising an active area and a bezel area disposed outside the active area, comprising; a plurality of gate lines and a plurality of data lines disposed to cross over each other; a plurality of pixel electrodes disposed between the data lines; a plurality of first touch/common electrodes disposed in the active area to form a horizontal electric field along with the plurality of pixel electrodes; a plurality of second touch/common electrodes disposed in the bezel area to be adjacent to first outermost touch/common electrodes disposed at an outermost column on one side of the active area; a gate driver disposed in the bezel area to overlap the plurality of second touch/common electrodes; a driver IC configured to supply a data voltage to the data lines, to supply a common voltage to the first touch/common electrodes during a display operation, and to supply a touch driving voltage to the first touch/common electrodes during a touch operation; and switching elements configured to connect or separate the first outermost touch/common electrodes and the second touch/common electrodes which are adjacent to each other.

The plurality of first touch/common electrodes comprise a (1-1)-th touch/common electrode disposed in a top left corner of the active area and extended to the bezel area on upper and left sides of the active area; a (1-2)-th touch/common electrode disposed in a top right corner of the active area and extended to the bezel area on the upper side of the active area; (1-3)-th touch/common electrodes disposed in a first direction between the (1-1)-th touch/common electrode and the (1-2)-th touch/common electrode and extended to the bezel area on the upper side of the active area; a (1-4)-th touch/common electrode disposed in a bottom left corner of the active area and extended to the bezel area on lower and left sides of the active area; a (1-5)-th touch/common electrode disposed in a bottom right corner of the active area and extended to the bezel area on the lower side of the active area; (1-6)-th touch/common electrodes disposed in the first direction between the (1-4)-th touch/common electrode and the (1-5)-th touch/common electrode and extended to the bezel area on the lower side of the active area; (1-7)-th touch/common electrodes disposed in a second direction crossing the first direction between the (1-1)-th touch/common electrode and the (1-4)-th touch/common electrode and extended to the bezel area on the left side of the active area; (1-8)-th touch/common electrodes disposed in the second direction between the (1-2)-th touch/common electrode and the (1-5)-th touch/common electrode and disposed in the active area; and a (1-9)-th touch/common electrode disposed only within the active area between the (1-7)-th touch/common electrodes and the (1-8)-th touch/common electrodes, wherein the first outermost touch/common electrodes consists of the (1-2)-th, the (1-8)-th, and the (1-5)-th touch/common electrodes.

A size of the (1-2)-th touch/common electrode is smaller than a size of the (1-1)-th touch/common electrode, and a size of each of the (1-3)-th touch/common electrodes, the (1-4)-th touch/common electrode, the (1-6)-th touch/common electrodes, the (1-7)-th touch/common electrodes, and the (1-9)-th touch/common electrodes is identical with the size of the (1-1)-th touch/common electrode.

The (1-2)-th, the (1-5)-th, (1-8)-th, and the second touch/common electrodes have same size.

The (1-2)-th, the (1-5)-th, and the (1-8)-th touch/common electrodes have identical same size, and a sum of the sizes of the (1-2)-th touch/common electrode and the second touch electrode which are adjacent to each other is same as the size of the (1-1)-th touch/common electrode.

During the display operation, the switching elements are turned on in response to a first control signal supplied through a control line and connect the first outermost touch/common electrodes to the second touch/common electrodes, respectively, which are adjacent to each other, and during the touch operation, the switching elements are turned off in response to a second control signal supplied through the control line and separate the first outmost touch/common electrodes from the second touch/common electrodes, respectively, which are adjacent to each other.

The switching elements are disposed in the bezel area, each of the switching elements includes a thin film transistor having a gate electrode disposed over a substrate, a semiconductor active layer disposed on a gate insulating film covering the gate electrode and disposed to overlap the gate electrode, and a source electrode and a drain electrode separated from each other so that a portion of the semiconductor active layer is exposed and disposed on the gate insulating film, and the gate electrode is connected to the control line disposed on the gate insulating film in the bezel area.

The first and the second touch/common electrodes are disposed on a fourth insulating film of first to fourth insulating films sequentially stacked over the switching element, the first outermost touch/common electrodes are respectively connected to the source electrodes of the Switching elements exposed through first contact holes penetrating the first to fourth insulating films, and the second touch/common electrodes are respectively connected to the drain electrodes of the switching elements exposed through second contact holes penetrating the first to fourth insulating films.

In accordance with the touch sensor-integrated type display device according to an embodiment of the present invention, there may be an advantage in that a display failure phenomenon due to the generation of parasitic capacitance can be prevented because parasitic capacitance is not generated between the touch electrodes disposed in the bezel area and the elements of a gate driver.

Furthermore, during a touch driving period, touch electrodes disposed in the outermost column of the active area and touch electrodes disposed only in the bezel area neighboring the active are connected and operate as a single touch electrode. Accordingly, there may be an advantage in that touch performance can be improved because capacitance can be compensated for by the touch electrode extended to the bezel area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
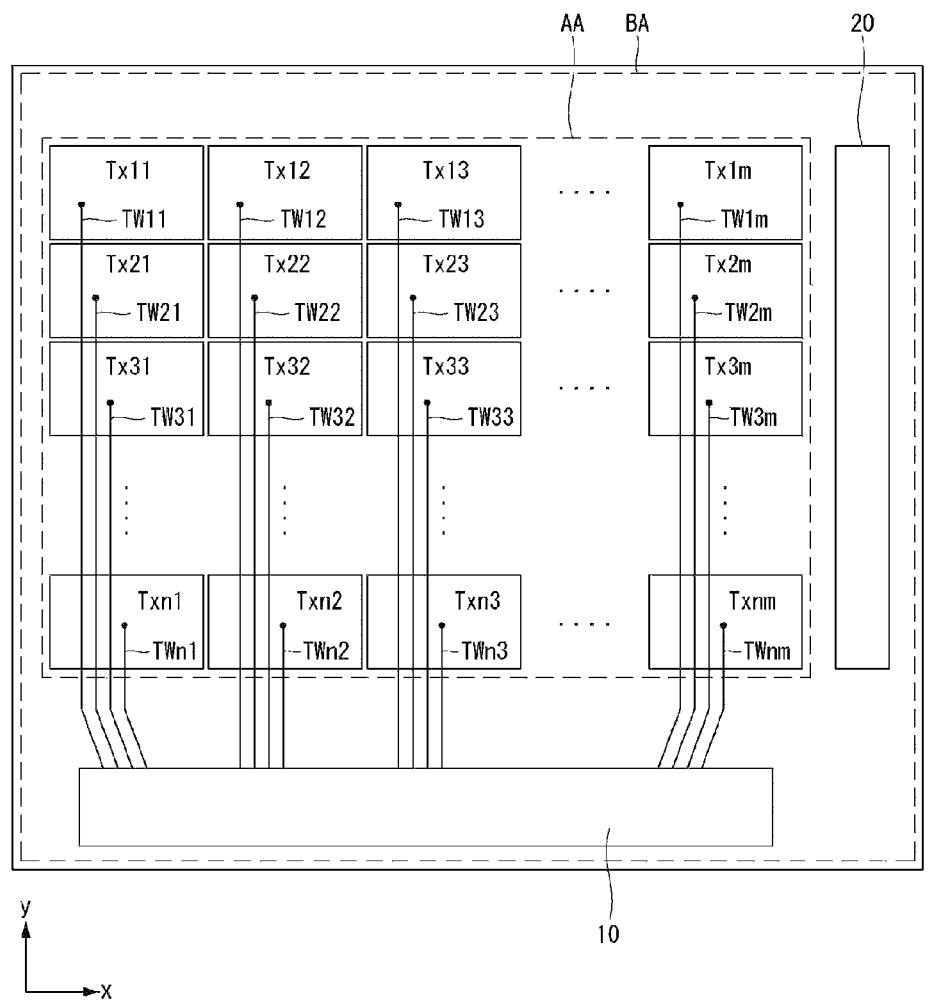
FIG. 1 is a schematic plan view showing a related art touch sensor-integrated type liquid crystal display device of a self-capacitance type.
Figure 2:
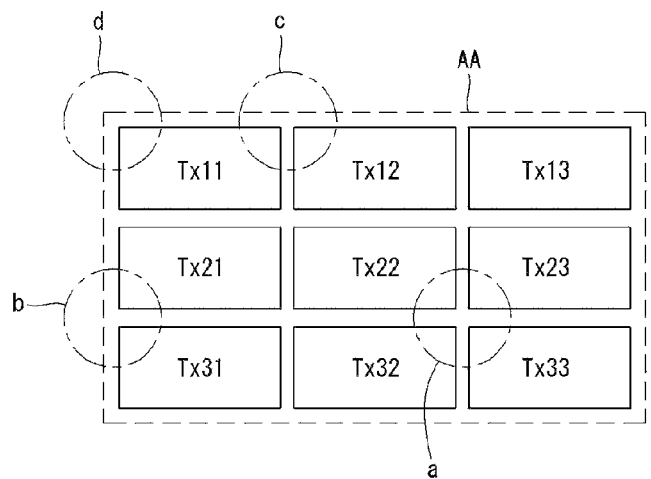
FIG. 2 shows some area of FIG. 1 and is a plan view illustrating touch accuracy according to a touch location.

Hereinafter, touch sensor-integrated type display devices according to some embodiments of the present invention are described in detail with reference to the accompanying drawings. In the specification, the same reference numerals denote the same elements. In the following description, a detailed description of the known functions and constitutions will be omitted if it is deemed to make the gist of the present invention unnecessarily vague. Furthermore, the names of elements used in the following description have been selected by taking into consideration only the ease of writing this specification and may be different from the names of actual parts.

First, a liquid crystal display device to which embodiments of the present invention are applied is described with reference to FIG. 3.

Figure 3:
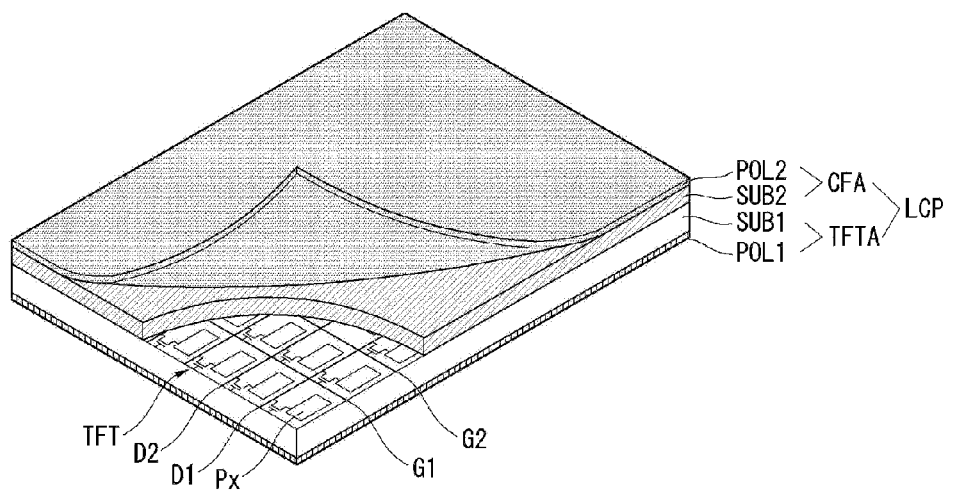
FIG. 3 is a partial exploded perspective view schematically showing a liquid crystal display device to which embodiments of the present invention are applied.

FIG. 3 is a partial exploded perspective view schematically showing a liquid crystal display device to which embodiments of the present invention are applied.

Referring to FIG. 3, the liquid crystal display device to which embodiments of the present invention are applied includes a liquid crystal panel (LCP) including a thin film transistor array (TFTA) and a color filter array (CFA) formed with a liquid crystal layer interposed therebetween.

The TFTA includes a plurality of gate lines G1 and G2 formed in parallel in a first direction (e.g., X-axis direction) on a first substrate SUB1, data lines D1 and D2 formed in parallel in a second direction (e.g., Y-axis direction) in such a way as to cross the plurality of gate lines G1 and G2, TFTs formed in the crossing of the gate lines G1 and G2 and the data lines D1 and D2, a plurality of pixel electrodes Px configured to charge liquid crystal cells with a data voltage, and common electrodes disposed opposite to the plurality of pixel electrodes Px.

The CFA includes a black matrix and a color filter formed on a second substrate SUB2. Polarization plates POL1 and POL2 are respectively attached to the external surfaces of the first substrate SUB1 and second substrate SUB2 of the LCP. Orientation films for setting the pretilt angles of liquid crystals are respectively formed on the internal surfaces of the first and the second substrates SUB1 and SUB2 coming into contact with the liquid crystals. A column spacer for maintaining the cell gap of a liquid crystal cell may be formed between the CFA and TFTA of the LCP.

The common electrodes are formed on the second substrate SUB2 in a vertical electric field driving method, such as twisted nematic (TN) mode or vertical alignment (VA) mode, and are formed on the first substrate SUB1 along with the pixel electrodes Px in a horizontal electric field driving method, such as in-plane switching (IPS) mode or fringe field switching (FFS) mode. In the following embodiments of the present invention, the horizontal electric field driving method in which the common electrodes and the pixel electrodes are formed on the first substrate SUB1 is described as an example.

A touch sensor-integrated type display device according to a first embodiment of the present invention is described below with reference to FIG. 4.

Figure 4:
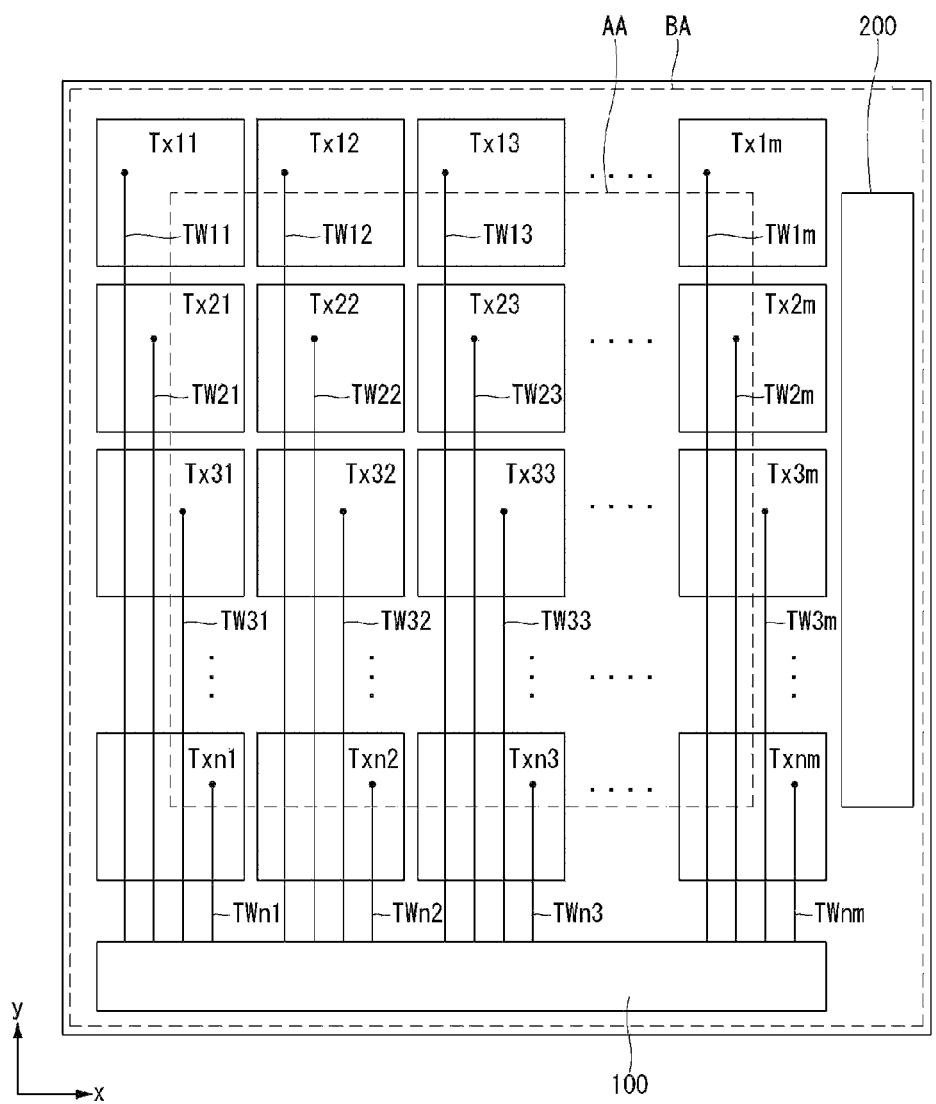
FIG. 4 is a schematic plan view showing a touch sensor-integrated type display device according to a first embodiment of the present invention.

FIG. 4 is a schematic plan view showing the touch sensor-integrated type display device according to the first embodiment of the present invention.

Referring to FIG. 4, the touch sensor-integrated type liquid crystal display device according to the first embodiment of the present invention includes an active area AA and a bezel area BA.

The active area AA includes a plurality of touch/common electrodes Tx11~Tx1$m$, Tx21~Tx2$m$, Tx31~Tx3$m$, ..., Txn1~Txnm divided in a first direction (e.g., X-axis direction) and a second direction (e.g., Y-axis direction) which cross each other and a plurality of routing lines TW11~TW1$m$, TW21~TW2$m$, TW31~TW3$m$, ..., TWn1~TWnm respectively connected to the plurality of touch/common electrodes Tx11~Tx1$m$, Tx21~Tx2$m$, Tx31~Tx3$m$, ..., Txn1~Txnm and extended in the second direction.

The plurality of touch/common electrodes Tx11~Tx1$m$, Tx21~Tx2$m$, Tx31~Tx3$m$, ..., Txn1~Txnm in the active area AA have been formed by dividing the common electrodes of the display device. The touch/common electrodes operate as common electrodes when display driving for displaying data is performed and operate as touch electrodes when touch driving for recognizing a touch location is performed. In the following embodiments, the touch/common electrode is simply called a touch electrode, for convenience sake.

The plurality of touch electrodes Tx11~Tx1$m$, Tx21~Tx2$m$, Tx31~Tx3$m$, and Tx41~Tx4$m$ are formed to have the same size. Furthermore, the touch electrodes Tx11~Tx1$m$ that belong to the plurality of touch electrodes Tx11~Tx1$m$, Tx21~Tx2$m$, Tx31~Tx3$m$, ..., Txn1~Txnm and that are placed at the top are extended from the active area AA to the bezel area BA on the upper side of FIG. 4. The touch electrodes Tx11~Txn1 that belong to the plurality of touch electrodes Tx11~Tx1$m$, Tx21~Tx2$m$, Tx31~Tx3$m$, ..., Txn1~Txnm and that are placed on the outermost left side are extended from the active area AA to the bezel area BA on the left of FIG. 4. The touch electrodes Tx1$m$~Txnm that belong to the plurality of touch electrodes Tx11~Tx1$m$, Tx21~Tx2$m$, Tx31~Tx3$m$, ..., Txn1~Txnm and that are placed on the outermost right side are extended from the active area AA to the bezel area BA on the right of FIG. 4. The touch electrodes Txn1~Txnm that belong to the plurality of touch electrodes Tx11~Tx1$m$, Tx21~Tx2$m$, Tx31~Tx3$m$, ..., Txn1~Txnm and that are placed at the bottom are extended from the active area AA to the bezel area BA on the lower side of FIG. 4. Accordingly, in each of the (1-1)-th touch electrodes Tx11~Tx1$m$, Txn1~Txnm, Tx21~Tx(n−1)1, and Tx2$m$~Tx(n−1)(m−1) that belong to the touch electrodes Tx11~Tx1$m$, Tx21~Tx2$m$, Tx31~Tx3$m$, ..., Txn1~Txnm and that are disposed at the border of the active area AA, the size of a portion placed in the active area AA for each of the (1-1)-th touch electrodes is smaller than the size of each of the (1-2)-th touch electrodes Tx22~Tx2(m−1), Tx32~Tx3(m−1), ..., Tx(n−1)2~Tx(n−1)(m−1) that are placed on the inner side of the active area AA.

The bezel area BA is disposed outside the active area AA. The bezel area BA includes the portions of the first touch electrodes Tx11~Tx1$m$, Txn1~Txnm, Tx21~Tx(n−1)1, and Tx2$m$~Tx(n−1)m extended from the active area AA, various lines, a driver IC 100 in which integrated chips (ICs) for driving a source driver and ICs for touch driving and sensing have been integrated, and a gate driver 200 for driving gate lines. The various lines include the routing lines TW11~TW1$m$, TW21~TW2$m$, TW31~TW3$m$, ..., TW1$m$~TWnm respectively connected to the touch electrodes Tx11~Tx1$m$, Tx21~Tx2$m$, Tx31~Tx3$m$, ..., Txn1~Txnm, data lines D1 and D2 (refer to FIG. 3) connected to the driver IC 100, and gate lines G1 and G2 connected to the gate driver 200 (refer to FIG. 3).

In the touch sensor-integrated type display device according to the first embodiment of the present invention, the (1-1)-th touch electrodes Tx22~Tx2(m−1), Tx32~Tx3(m−1), ..., Tx(n−1)1~Tx(n−1)(m−1) formed only in the active area AA and the (1-2)-th touch electrodes Tx11~Tx1$m$, Txn1~Txnm, Tx21~Tx(n−1)1, and Tx2$m$~Tx(n−1)m extended from the active area AA to the bezel area BA on the right and left sides and at the top and bottom are formed to have the same size.

Furthermore, dummy pixel electrodes configured to have the same structure as the pixel electrodes Px formed in the active area AA and gate lines GL extended from the active area AA may be formed in the bezel area BA on the left and right of the active area AA. Dummy data lines may be formed in the bezel area BA on the left and right of the active area AA. Dummy pixel electrodes configured to have the same structure as the pixel electrodes Px formed in the active area AA and data lines DL extended from the active area AA may also be formed in the bezel area BA on the top and bottom of the active area AA. Dummy gate lines may be formed in the bezel area BA on the left and right of the active area AA.

In the touch sensor-integrated type display device according to the first embodiment of the present invention, the (1-1)-th touch electrodes Tx22~Tx2(m−1), Tx32~Tx3(m−1), ..., Tx(n−1)1~Tx(n−1) (m−1) formed only in the active area AA and the (1-2)-th touch electrodes Tx11~Tx1$m$, Txn1~Txnm, Tx21~Tx(n−1)1, and Tx2$m$~Tx(n−1)m extended from the active area AA to the bezel area BA on the right and left sides and at the top and bottom are formed to have the same size. If touch electrodes are formed as described above, although a touch is performed in an edge or corner portion of an active area, capacitance can be compensated for by the portion of a touch electrode extended to a bezel area. Accordingly, there may be an advantage in that touch performance can be improved.

Furthermore, in the touch sensor-integrated type display device according to the first embodiment of the present invention, as in the pixel electrodes and the signal lines formed in the active area AA, the dummy pixel electrodes and the signal lines extended from the active lines are also formed in the bezel area BA. Accordingly, there may be an advantage in that touch accuracy can be improved because initial capacitance can be similarly maintained in the active area and the bezel area.

In the touch sensor-integrated type display device according to the first embodiment of the present invention, dummy data lines may be formed in the bezel area BA on the left and right of the active area, and dummy gate lines may be formed in the bezel area on the left and right of the active area.

In the touch sensor-integrated type display device according to the first embodiment of the present invention, however, the area in which the gate driver 200 is disposed moves to the right due to the touch electrodes Tx1m, Tx2m, Tx3m, . . . , Txnm extended to the outside of the active area AA and disposed in the rightmost column, as shown in FIG. 4. Accordingly, there is a problem in that the bezel area BA is increased.

Figure 5A:
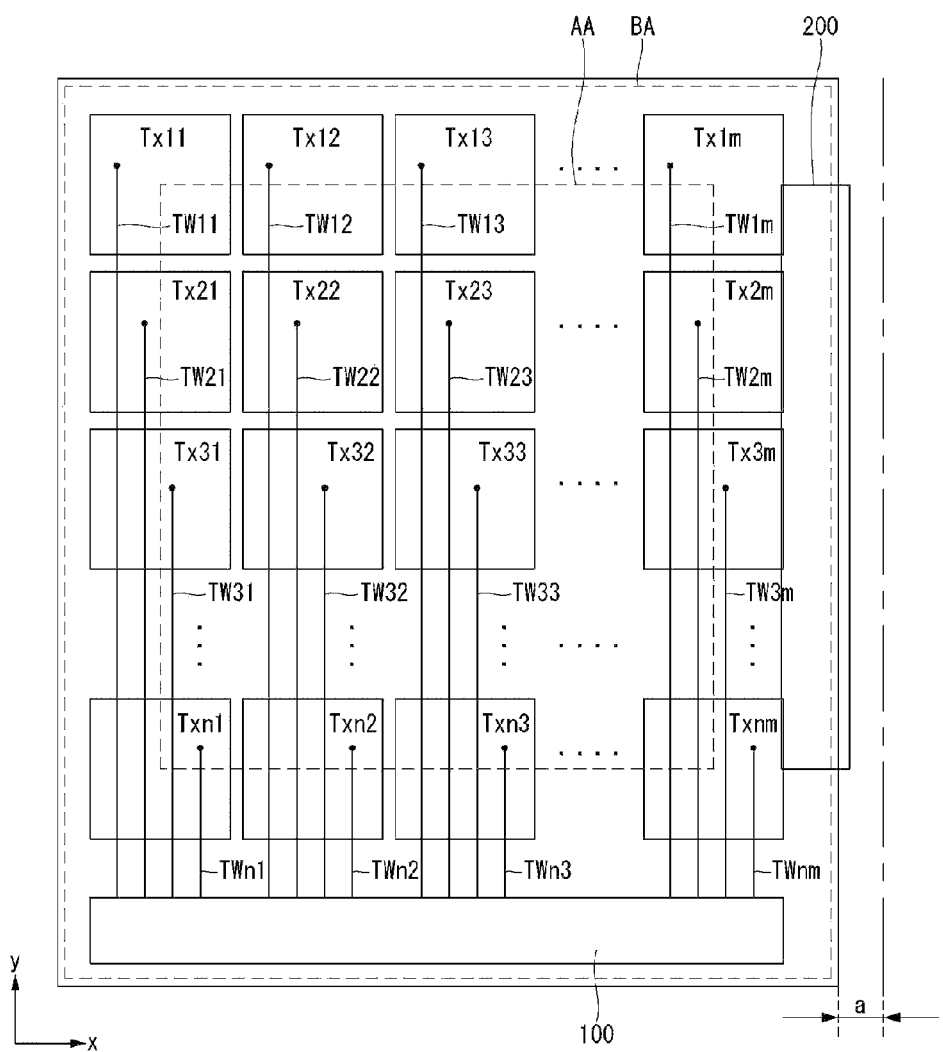
FIGS. 5A and 5B are plan views showing problems generated when the bezel area of the touch sensor-integrated type display device according to the first embodiment of the present invention is reduced.
Figure 5B:
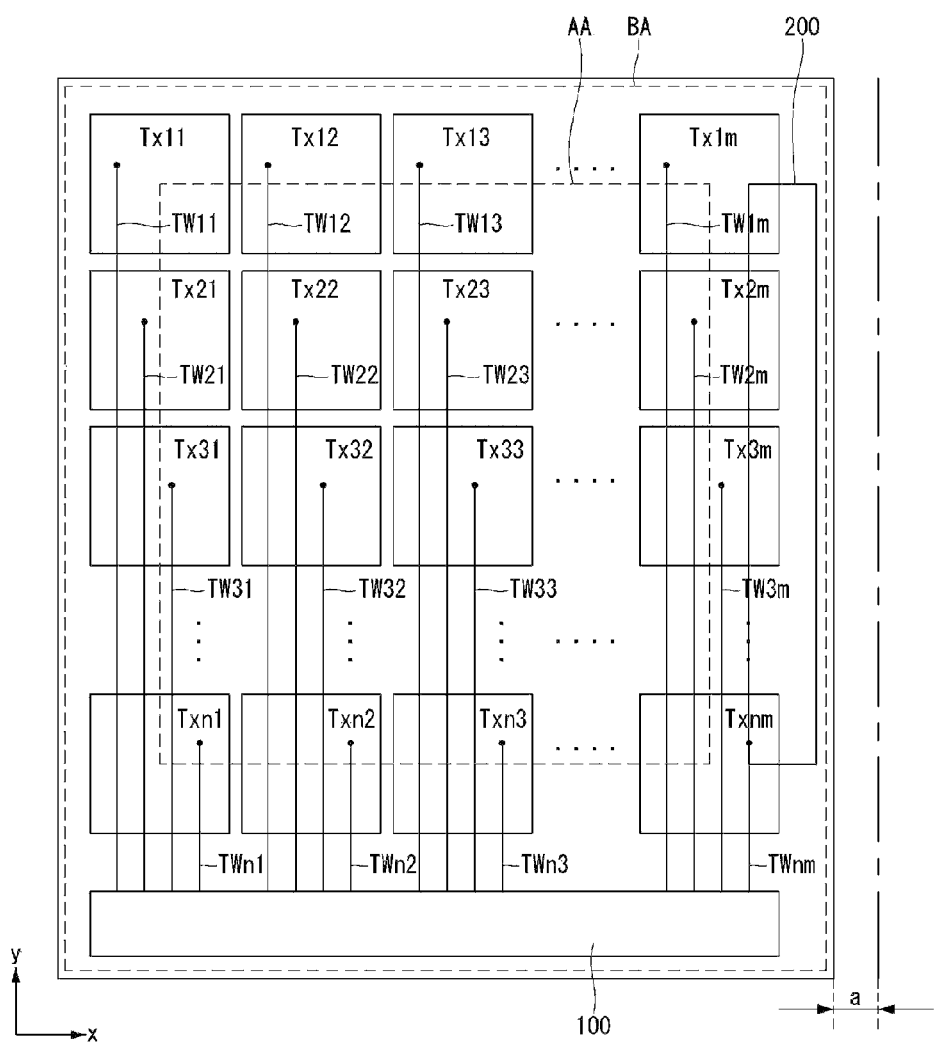

In order to prevent an increase of the bezel area BA outside the active area AA, the gate driver 200 needs to be mounted on a separate printed circuit board and externally protruded as shown in FIG. 5A, or the gate driver 200 needs to overlap the touch electrodes Tx1m, Tx2m, Tx3m, . . . , Txnm disposed in the rightmost column as shown in FIG. 5B.

In the touch sensor-integrated type display device of FIG. 5A, however, the width of the bezel area BA may be reduced by "a", but there is another problem in that an additional process is necessary compared to a prior art because the gate driver 200 is mounted on a separate printed circuit board. Furthermore, in the touch sensor-integrated type display device of FIG. 5B, the width of the bezel area BA may be reduced by "a" because the gate driver 200 overlaps the touch electrodes Tx1m~Txnm disposed in the rightmost column, but there is another problem in that a driving failure in a display is generated because parasitic capacitance is generated between the touch electrodes Tx1m, Tx2m, Tx3m, . . . , Txnm and the elements of the gate driver 200 in the overlap portions of the touch electrodes Tx1m, Tx2m, Tx3m, . . . , Txnm and the gate driver 200.

Accordingly, in order to reduce the bezel area BA without affecting display driving, the problems of the touch sensor-integrated type display devices shown in FIGS. 5A and 5B need to be solved.

A touch sensor-integrated type display device according to a second embodiment of the present invention is described below with reference to FIGS. 6 and 7.

Figure 6:
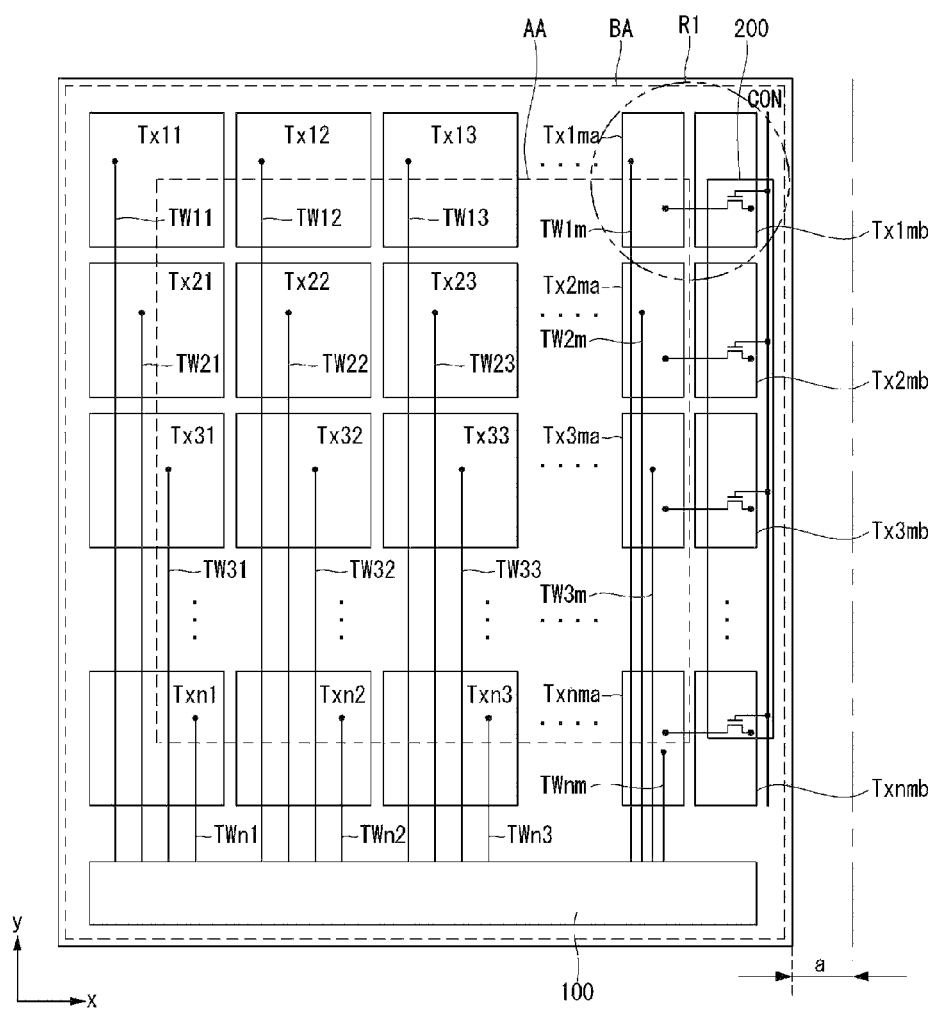
FIG. 6 is a schematic plan view showing a touch sensor-integrated type display device according to a second embodiment of the present invention.
Figure 7:
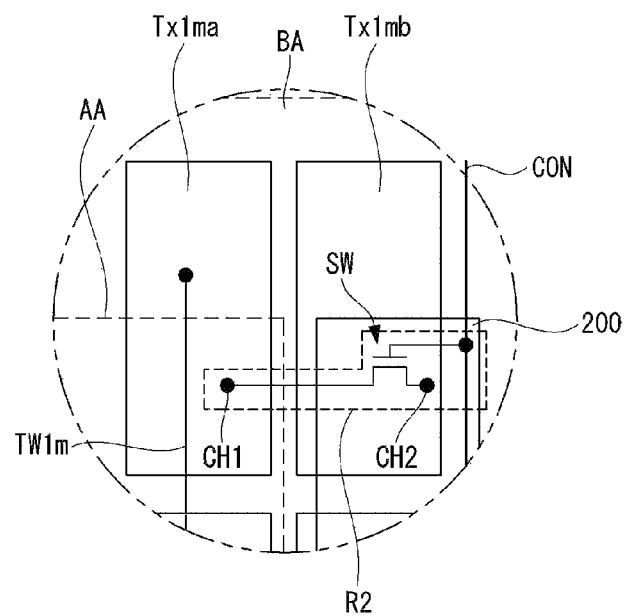
FIG. 7 is an enlarged plan view showing the region R1 of the touch sensor-integrated type display device of FIG. 6 according to the second embodiment of the present invention.

FIG. 6 is a schematic plan view showing the touch sensor-integrated type display device according to the second embodiment of the present invention, and FIG. 7 is an enlarged plan view showing the region R1 of the touch sensor-integrated type display device of FIG. 6 according to the second embodiment of the present invention.

The touch sensor-integrated type display device according to the second embodiment of the present invention is substantially the same as the touch sensor-integrated type display device of the first embodiment except that each of the outermost touch electrodes Tx1m, Tx2m, Tx3m, . . . , Txnm adjacent to the gate driver 200 is divided into two, one of the divided two electrodes is disposed in the active area AA, the other of the divided two electrodes is disposed in the bezel area BA, and a TFT, that is, a switching element SW for connecting or separating the divided two electrodes, is used. Accordingly, in the following description, in order to avoid a redundant description, portions different from those of the touch sensor-integrated type display device according to the first embodiment are chiefly described.

Referring to FIGS. 6 and 7, the touch sensor-integrated type display device according to the second embodiment of the present invention includes an active area AA and a bezel area BA.

The active area AA includes a plurality of touch/common electrodes Tx11~Tx1ma, Tx21~Tx2ma, Tx31~Tx3ma, . . . , Txn1~Txnma divided in a first direction (e.g., X-axis direction) and a second direction (e.g., Y-axis direction) which cross each other and a plurality of routing lines TW11~TW1m, TW21~TW2m, TW31~TW3m, . . . , TWn1~TWnm respectively connected to the plurality of touch/common electrodes Tx11~Tx1ma, Tx21~Tx2ma, Tx31~Tx3ma, . . . , Txn1~Txnma and extended in the second direction.

The plurality of touch/common electrodes Tx11~Tx1ma, Tx21~Tx2ma, Tx31~Tx3ma, . . . , Txn1~Txnma in the active area AA has been formed by dividing the common electrodes of the display device. The touch/common electrodes operate as common electrodes when display driving for displaying data is performed and operate as touch electrodes when touch driving for recognizing a touch location is performed. In the following description, the touch/common electrode is simply called a touch electrode, for convenience sake.

The plurality of touch electrodes Tx11~Tx1ma, Tx21~Tx2ma, Tx31~Tx3ma, . . . , Txn1~Txnma disposed in the active area AA include the first touch electrode Tx11, the second touch electrode Tx1ma, the plurality of third touch electrodes Tx12, Tx13, . . . , Tx1(m−1), the fourth touch electrode Txn1, the fifth touch electrode Txnma, the plurality of sixth touch electrodes Txn2, Txn3, . . . , Txn(m−1), the plurality of seventh touch electrodes Tx21, Tx31, and Tx(n−1)1, the plurality of eighth touch electrodes Tx2ma, Tx3ma, . . . , Tx(n−1)(m−1), and the plurality of ninth touch electrodes Tx22~Tx2(m−1), Tx32~Tx3(m−1), . . . , Tx(n−1)2~Tx(n−1) (m−1).

The first touch electrode Tx11 is disposed in the top left corner of the active area AA and extended to the bezel area BA on the upper and left sides of the active area AA.

The second touch electrode Tx1ma is disposed in the top right corner of the active area AA and extended to the bezel area BA on the upper side of the active area AA. The size of the second touch electrode Tx1ma is smaller than that of the first touch electrode Tx11.

The plurality of third touch electrodes Tx12, Tx13, . . . , Tx1(m−1) are disposed in the first direction (e.g., the X-axis direction) between the first touch electrode Tx11 and the second touch electrode Tx1ma and are extended to the bezel area BA on the upper side of the active area AA. Each of the third touch electrodes Tx12, Tx13, . . . , Tx1(m−1) has the same size as the first touch electrode Tx11.

The fourth touch electrode Txn1 is disposed in the bottom left corner of the active area AA and extended to the bezel area BA on the lower and left sides of the active area AA. The fourth touch electrode Txn1 has the same size as the first touch electrode Tx11.

The fifth touch electrode Txnma is disposed in the bottom right corner of the active area AA and extended to the bezel area BA on the lower side of the active area AA. The fifth touch electrode Txnma has the same size as the second touch electrode Tx1ma.

The plurality of sixth touch electrodes Txn2, Txn3, . . . , Txn(m−1) are disposed in the first direction between the fourth touch electrode Txn1 and the fifth touch electrode Txnma and are extended to the bezel area BA on the lower side of the active area AA. Each of the sixth touch electrodes Txn2, Txn3, . . . , Txn(m−1) has the same size as the first touch electrode Tx11.

The plurality of seventh touch electrodes Tx21, Tx31, and Tx(n−1)1 are disposed in the second direction (e.g., the Y-axis direction) between the first touch electrode Tx11 and the fourth touch electrode Txn1 and are extended to the bezel area BA on the left of the active area AA. Each of the plurality of seventh touch electrodes Tx21, Tx31, and Tx(n−1)1 has the same size as the first touch electrode Tx11.

The plurality of eighth touch electrodes Tx2ma, Tx3ma, . . . , Tx(n−1)(m−1) are disposed in the second direction between the second touch electrode Tx1ma and the fifth touch electrode Txnma and are extended to the bezel area BA on the right of the active area AA. Each of the plurality of eighth touch electrodes Tx2ma, Tx3ma, . . . , Tx(n−1)(m−1) has the same size as the second touch electrode Tx1ma.

The plurality of ninth touch electrodes Tx22~Tx2(m−1), Tx32~Tx3(m−1), . . . , Tx(n−1)2~Tx(n−1)(m−1) are disposed only within the active area AA between the plurality of seventh touch electrodes Tx21, Tx31, and Tx(n−1)1 and the plurality of eighth touch electrodes Tx2ma, Tx3ma, . . . , Tx(n−1)(m−1). Each of the plurality of ninth touch electrodes Tx22~Tx2(m−1), Tx32~Tx3(m−1), . . . , Tx(n−1)2~Tx(n−1)(m−1) has the same size as the first touch electrode Tx11.

The bezel area BA is disposed outside the active area AA. The bezel area BA includes some portions of the first touch electrode Tx11, the second touch electrode Tx1ma, the plurality of third touch electrodes Tx12, Tx13, . . . , Tx1(m−1), the fourth touch electrode Txn1, the fifth touch electrode Txnma, the plurality of sixth touch electrodes Txn2, Txn3, . . . , Txn(m−1), and the plurality of seventh touch electrodes Tx21, Tx31, and Tx(n−1)1 extended from the active area AA.

Furthermore, the bezel area BA includes tenth touch electrodes Tx1mb, Tx2mb, Tx3mb, . . . , Txnmb disposed adjacent to the second, the eighth, and the fifth touch electrodes Tx1ma; Tx2ma, Tx3ma, . . . , Tx(n−1)(m−1); and Txnma and disposed in the second direction in such a way as to overlap the gate driver 200. The size of each of the tenth touch electrodes Tx1mb, Tx2mb, Tx3mb, . . . , Txnmb may be the same as that of the second touch electrode Tx1ma, but may be larger than or smaller than the size of the second touch electrode Tx1ma. If the size of each of the tenth touch electrodes Tx1mb, Tx2mb, Tx3mb, . . . , Txnmb is different from that of the second touch electrode Tx1ma, the size of the sum of each of the second, the eighth, and the fifth touch electrodes Tx1ma, Tx2ma, Tx3ma, . . . , Tx(n−1)(m−1), and Txnma and each of the tenth touch electrodes Tx1mb, Tx2mb, Tx3mb, . . . , Txnmb which are adjacent to each other may be the same as the size of the first touch electrode Tx11.

Furthermore, the bezel area BA includes switching elements SW configured to connect or separate the second touch electrode Tx1ma and the (10-1)-th touch electrode Tx1mb, the eighth touch electrodes Tx2ma, Tx3ma, . . . , Tx(−1)(m−1) and the (10-2)-th to (10-(n−1))-th touch electrodes Tx2mb, Tx3mb, . . . , Tx(n−1)(m−1)b, and the fifth touch electrode Txnma and the (10-n)-th touch electrode Txnmb which are adjacent to each other. The switching element SW may be formed of a TFT because a separate process is not required when a TFT disposed in each pixel area of the display panel is formed. The bezel area BA further includes a control line CON for controlling the switching elements SW. The control line CON electrically connects or separates the second touch electrode Tx1ma and the (10-1)-th touch electrode Tx1mb, the eighth touch electrodes Tx2ma, Tx3ma, . . . , Tx(n−1)(m−1)a and the (10-2)-th to the (10-(n−1))-th touch electrodes Tx2mb, Tx3mb, . . . , Tx(n−1)(m−1)b, the fifth touch electrode Txnma and the (10-n)-th touch electrode Txnmb which are adjacent to each other by applying a control signal to the gate electrodes of the TFTs, that is, the switching elements SW, so that the TFTs are turned on or off.

The bezel area BA further includes various lines including the routing lines TW11~TW1m, TW21~TW2m, TW31~TW3m, . . . , TWn1~TWnm, a driver IC 100 in which ICs for driving a source driver and ICs for touch driving and sensing have been integrated, and a gate driver 200 for driving gate lines. The gate driver 200 is formed in the substrate of a gate in panel (GIP) type display panel. The various lines include the routing lines TW11~TW1m, TW21~TW2m, TW31~TW3m, . . . , TWn1~TWnm respectively connected to the touch electrodes Tx11~Tx1m, Tx21~Tx2m, Tx31~Tx3m, . . . , Txn1~Txnm shown in FIG. 6 and configured to connect the touch electrodes Tx11~Tx1m, Tx21~Tx2m, Tx31~Tx3m, . . . , Txn1~Txnm to the driver IC 100, data lines extended from the active area AA and connected to the driver IC 100, and the gate lines extended from the active area AA and connected to the gate driver 200.

A cross-sectional structure of the touch sensor-integrated type display device according to the second embodiment of the present invention is described below with reference to FIG. 8.

Figure 8:
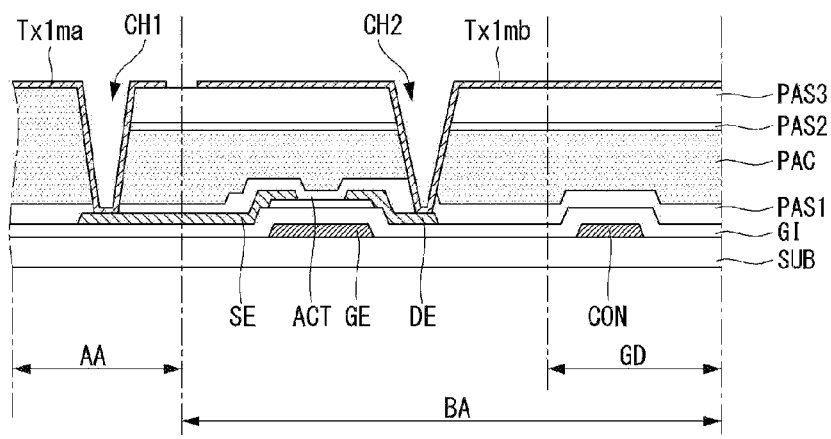
FIG. 8 is a cross-sectional view showing a region R2 shown in FIG. 7.

FIG. 8 is a cross-sectional view showing a region R2 shown in FIG. 7.

In the following description, a description of common display elements, such as the gate lines, the data lines, the TFTs, and the pixel electrodes disposed in the active area AA, and the elements of the gate driver 200 and the driver IC 100 disposed in the bezel area BA is omitted in order not to make complicated a description of the present invention. Accordingly, it should be understood that the common display elements which were disclosed prior to the application of the present invention and which may be applied to an embodiment of the present invention are included in an embodiment of the present invention.

Referring to FIG. 8, a gate electrode GE and the control line CON are disposed in the bezel area BA of a substrate SUB. A gate insulating film GI is disposed on the entire surface of the substrate SUB so that it covers the gate electrode GE and the control line CON.

A semiconductor active layer ACT, a source electrode SE, and a drain electrode DE which form a TFT are formed on the gate insulating film GI. The semiconductor active layer ACT is disposed on the gate insulating film GI in such a way as to overlap the gate electrode GE. The source electrode SE and the drain electrode DE are disposed on the gate insulating film GI so that part of the semiconductor active layer ACT is exposed. The source electrode SE and the drain electrode DE are separated from each other. The source electrode SE of the TFT is extended from the bezel area BA to the active area AA.

In the aforementioned embodiment, the TFT has been illustrated as being a TFT having a gate bottom structure in which the gate electrode GE is formed in a layer below the source electrode SE and the drain electrode DE, but the present invention is not limited thereto. If a TFT formed in a pixel area of the active area AA has a gate top structure, it should be understood that the TFT disposed in the bezel area BA according to an embodiment of the present invention is a TFT having a gate top structure in which a gate electrode is formed over source and drain regions. The construction of the TFT having the gate top structure has been widely known, and a detailed description thereof is omitted.

A first passivation film PAS1 is disposed on the entire surface of the substrate SUB so that it covers the TFT and the gate insulating film GI.

An organic insulating film PAC, a second passivation film PAS2, and a third passivation film PAS3 are sequentially stacked on the entire surface of the first passivation film PAS1.

The first to ninth touch electrodes Tx11; Tx1ma; Tx12, Tx13, . . . , Tx1(m−1); Txn1; Txnma; Txn2, Txn3, . . . , Txn(m−1); Tx21, Tx31, Tx(n−1)1; Tx2ma, Tx3ma, . . . , Tx(n−1) (m−1); and Tx22~Tx2(m−1), Tx32~Tx3(m−1), . . . , Tx(n−1)2~Tx(n−1)(m−1), and the tenth touch electrodes Tx1mb, Tx2mb, Tx3mb, . . . , Txnmb are disposed on the third passivation film PAS3. Each of the first to ninth touch electrodes Tx11; Tx1ma; Tx12~Tx1m−1; Txn1; Txnma; Txn2~Txnm−1; Tx21~Txn−1; Tx2ma~Txnm−1; Tx22~Txn-1m−1 is disposed in at least one of the active area AA and the bezel area BA. The routing lines TW11~TWnm are respectively connected to the first to ninth touch electrodes Tx11; Tx1ma; Tx12~Tx1m−1; Txn1; Txnma; Txn2~Txnm−1; Tx21~Txn−1; Tx2ma~Txnm−1; and Tx22~Txn-1m−1. The routing lines TW11~TWnm may be disposed on the second passivation film PAS2. In this case, the first to ninth touch electrodes Tx11; Tx1ma; Tx12~Tx1m−1; Txn1; Txnma; Txn2~Txnm−1; Tx21~Txn−1; Tx2ma~Txnm−1; and Tx22~Txn-1m−1 are respectively connected to the routing lines TW11~TWnm through a contact hole configured to penetrate the third passivation film PAS3.

The tenth touch electrodes Tx1mb, Tx2mb, Tx3mb, . . . , Txnmb are disposed only in the bezel area BA in such a way as to overlap the gate driver 200. No routing lines are connected to the tenth touch electrodes Tx1mb, Tx2mb, Tx3mb, . . . , Txnmb.

A first contact hole CH1 configured to penetrate the third passivation film PAS3, the second passivation film PAS2, the organic insulating film PAC, and the first passivation film PAS1 so that the source electrode SE of the TFT is exposed is formed in the active area AA. A second contact hole CH2 configured to penetrate the third passivation film PAS3, the second passivation film PAS2, the organic insulating film PAC, and the first passivation film PAS1 so that the drain electrode DE of the TFT is exposed is formed in the bezel area BA.

The gate electrode GE of the TFT and the control line CON are formed in the same layer and are connected as shown in FIG. 7.

In accordance with such a configuration, the second touch electrode Tx1ma disposed in the rightmost column of the active area AA is connected to the source electrode SE of the TFT, and the (10-1)-th touch electrode Tx1mb which is disposed in the bezel area BA and which is adjacent to the second touch electrode Tx1ma is connected to the drain electrode DE of the TFT. Accordingly, when the TFT is turned on in response to a control signal supplied through the control line CON, the second touch electrode Tx1ma and the (10-1)-th touch electrode Tx1mb are connected. When the TFT is turned off, the second touch electrode Tx1ma and the (10-1)-th touch electrode Tx1mb are separated.

Likewise, the remaining eighth touch electrodes Tx2ma~Txn-1ma) and the fifth touch electrode Txnma disposed in the rightmost column of the active area AA and the (10-2)-th to (10-n)-th touch electrodes Tx2mb~Txnmb adjacent to the eighth touch electrodes Tx2ma~Txn-1ma and the fifth touch electrode Txnma are connected or separated by the TFTs.

The touch sensor-integrated type display device configured as described above according to the second embodiment of the present invention is subjected to time-division driving in a display driving period and a touch sensor driving period during 1 frame.

During the display driving period, a first control signal is supplied to the TFTs through the control line CON so that the TFTs are turned off. In response thereto, the second, the eighth, and the fifth touch electrodes Tx1ma; Tx2ma, Tx3ma, . . . , Tx(n−1)(m−1); and Txnma disposed in the outermost column of the active area AA and the tenth touch electrodes Tx1mb~Txnmb disposed only in the bezel area BA neighboring the active area AA are separated. Accordingly, a common voltage for display driving is supplied to the first to ninth touch electrodes Tx11~Txnma disposed in the active area AA, but the common voltage is not supplied to the tenth touch electrodes Tx1mb~Txnmb disposed only in the bezel area BA.

During the touch sensor driving period, a second control signal is supplied to the TFTs through the control line CON so that the TFTs are turned on. In response thereto, the second, the eighth, and the fifth touch electrodes Tx1ma; Tx2ma, Tx3ma, . . . , Tx(n−1)(m−1); and Txnma disposed in the outermost column of the active area AA and the tenth touch electrodes Tx1mb~Txnmb disposed only in the bezel area BA neighboring the active area AA are connected. Accordingly, a touch driving voltage is supplied to all of the first to ninth touch electrodes Tx11~Txnma disposed in the active area AA and the tenth touch electrodes Tx1mb~Txnmb disposed only in the bezel area BA.

Furthermore, during the touch sensor driving period, a voltage having the same phase and amplitude as the touch driving voltage is also supplied to the first to ninth touch electrodes, the data lines, and the gate lines so that parasitic capacitance is not generated between the data lines, the gate lines, and the touch electrodes.

As described above, in accordance with the touch sensor-integrated type display device according to the second embodiment of the present invention, during the display driving period, the common voltage is not supplied to the tenth touch electrodes Tx1mb~Txnmb disposed only in the bezel area BA. Accordingly, although the tenth touch electrodes Tx1mb~Txnmb overlap the elements of the gate driver 200, parasitic capacitance is not generated between the tenth touch electrodes Tx1mb~Txnmb and the elements of the gate driver 200. Accordingly, there may be an advantage in that a display failure phenomenon attributable to parasitic capacitance occurring due to the overlap of the tenth touch electrodes Tx1mb~Txnmb and the elements of the gate driver 200 can be prevented.

Furthermore, during the touch sensor driving period, the second, the eighth, and the fifth touch electrodes Tx1ma~Txnma disposed in the outermost column of the active area AA and the tenth touch electrodes Tx1mb~Txnmb disposed only in the bezel area BA neighboring the active area AA are connected. Accordingly, the connected touch electrodes operate as a single touch electrode. Accordingly, there may be an advantage in that touch performance can be improved because capacitance can be compensated for by the touch electrode extended to the bezel area.

Those skilled in the art will understand that the present invention may be changed and modified in various ways without departing from the technical spirit of the present invention through the aforementioned contents. Accordingly, the technical scope of the present invention is not limited to the contents described in the detailed description of the specification, but should be determined by the claims.

What is claimed is:

1. A touch sensor-integrated type display device including an active area and a bezel area disposed outside the active area, comprising:
 a plurality of gate lines and a plurality of data lines disposed to cross over each other;
 a plurality of pixel electrodes disposed between the data lines;
 a plurality of first touch/common electrodes disposed in the active area to form a horizontal electric field along with the plurality of pixel electrodes;
 a plurality of second touch/common electrodes disposed in the bezel area to be adjacent to first outermost touch/common electrodes disposed at an outermost column on one side of the active area;
 a gate driver disposed in the bezel area to overlap the plurality of second touch/common electrodes;
 a driver IC configured to:
  supply a data voltage to the data lines,
  supply a common voltage to the plurality of first touch/common electrodes during a display operation, and
  supply a touch driving voltage to the plurality of first touch/common electrodes during a touch operation; and
 switching elements configured to connect or separate the first outermost touch/common electrodes and the plurality of second touch/common electrodes which are adjacent to each other.

2. The touch sensor-integrated type display device of claim 1, wherein the plurality of first touch/common electrodes comprise:
 a (1-1)-th touch/common electrode disposed in a top left corner of the active area and extended to the bezel area on upper and left sides of the active area;
 a (1-2)-th touch/common electrode disposed in a top right corner of the active area and extended to the bezel area on the upper side of the active area;
 a (1-3)-th touch/common electrodes disposed in a first direction between the (1-1)-th touch/common electrode and the (1-2)-th touch/common electrode and extended to the bezel area on the upper side of the active area;
 a (1-4)-th touch/common electrode disposed in a bottom left corner of the active area and extended to the bezel area on lower and left sides of the active area;
 a (1-5)-th touch/common electrode disposed in a bottom right corner of the active area and extended to the bezel area on the lower side of the active area;
 a (1-6)-th touch/common electrodes disposed in the first direction between the (1-4)-th touch/common electrode and the (1-5)-th touch/common electrode and extended to the bezel area on the lower side of the active area;
 a (1-7)-th touch/common electrodes disposed in a second direction crossing the first direction between the (1-1)-th touch/common electrode and the (1-4)-th touch/common electrode and extended to the bezel area on the left side of the active area;
 a (1-8)-th touch/common electrodes disposed in the second direction between the (1-2)-th touch/common electrode and the (1-5)-th touch/common electrode and disposed in the active area; and
 a (1-9)-th touch/common electrode disposed only within the active area between the (1-7)-th touch/common electrodes and the (1-8)-th touch/common electrodes,
 wherein the first outermost touch/common electrodes includes the (1-2)-th, the (1-8)-th, and the (1-5)-th touch/common electrodes.

3. The touch sensor-integrated type display device of claim 2, wherein
 a size of the (1-2)-th touch/common electrode is smaller than a size of the (1-1)-th touch/common electrode, and
 a size of each of the (1-3)-th touch/common electrodes, the (1-4)-th touch/common electrode, the (1-6)-th touch/common electrodes, the (1-7)-th touch/common electrodes, and the (1-9)-th touch/common electrodes is identical with the size of the (1-1)-th touch/common electrode.

4. The touch sensor-integrated type display device of claim 3, wherein the (1-2)-th, the (1-5)-th, (1-8)-th, and the second touch/common electrodes have a same size.

5. The touch sensor-integrated type display device of claim 3, wherein:
 the (1-2)-th, the (1-5)-th, and the (1-8)-th touch/common electrodes have a same size, and
 a sum of the sizes of the (1-2)-th touch/common electrode and the second touch electrode which are adjacent to each other is same as the size of the (1-1)-th touch/common electrode.

6. The touch sensor-integrated type display device of claim 1, wherein during the display operation, the switching elements are turned off in response to a first control signal supplied through a control line to electrically disconnect the first outermost touch/common electrodes from the second touch/common electrodes, respectively, which are adjacent to each other, and
 during the touch operation, the switching elements are turned on in response to a second control signal supplied through the control line to electrically connect the first outmost touch/common electrodes to the second touch/common electrodes, respectively, which are adjacent to each other.

7. The touch sensor-integrated type display device of claim 1, wherein the switching elements are disposed in the bezel area,
 each of the switching elements includes a thin film transistor having a gate electrode disposed over a substrate, a semiconductor active layer disposed on a gate insulating film covering the gate electrode and disposed to overlap the gate electrode, and a source electrode and a drain electrode separated from each other so that a portion of the semiconductor active layer is exposed and disposed on the gate insulating film, and
 the gate electrode is connected to the control line disposed on the gate insulating film in the bezel area.

8. The touch sensor-integrated type display device of claim 7, wherein the first and the second touch/common electrodes are disposed on a fourth insulating film of first to fourth insulating films sequentially stacked over the switching element,
 the first outermost touch/common electrodes are respectively connected to the source electrodes of the switching elements exposed through first contact holes penetrating the first to fourth insulating films, and
 the second touch/common electrodes are respectively connected to the drain electrodes of the switching elements exposed through second contact holes penetrating the first to fourth insulating films.

9. A touch sensor-integrated type display device including an active area and a bezel area disposed outside the active area, comprising:
a plurality of gate lines and data lines crossing each other;
a plurality of first group of touch/common electrodes disposed in the active area;
a plurality of second group of touch/common electrodes disposed in the bezel area to be adjacent to first outermost touch/common electrodes disposed at an outermost column on one side of the active area;
a gate driver disposed in the bezel area to overlap the plurality of second group of touch/common electrodes;
a driver IC configured to supply a data voltage to the data lines, supply a common voltage to the plurality of first group of touch/common electrodes during a display operation, and supply a touch driving voltage to the plurality of first group of touch/common electrodes during a touch operation; and
switching elements configured to electrically connect the first outermost touch/common electrodes to the plurality of second group of touch/common electrodes adjacent to each other.

10. The touch sensor-integrated type display device of claim 9, wherein the plurality of first group of touch/common electrodes comprise:
a first touch/common electrode to a fourth touch/common electrode disposed in a top left corner, a top right corner, a bottom left corner, and a bottom right corner of the active area and extended to the bezel area on upper and left sides, upper side, lower and left sides, and lower side of the active area, respectively;
a first set of touch/common electrodes disposed in a first direction between the first touch/common electrode and the second touch/common electrode and extended to the bezel area on the upper side of the active area;
a second set of touch/common electrodes disposed in the first direction between the fourth touch/common electrode and the fifth touch/common electrode and extended to the bezel area on the lower side of the active area;
a third set of touch/common electrodes disposed in a second direction crossing the first direction between the first touch/common electrode and the fourth touch/common electrode and extended to the bezel area on the left side of the active area;
a fourth set of touch/common electrodes disposed in the second direction between the second touch/common electrode and the fifth touch/common electrode and disposed in the active area; and
a fifth set of touch/common electrodes disposed only within the active area between the third set of touch/common electrodes and the fourth set of touch/common electrodes,
wherein the first outermost touch/common electrodes includes the second touch/common electrode, the fourth set of touch/common electrodes, and the fifth touch/common electrode.

11. The touch sensor-integrated type display device of claim 10, wherein
a size of the second touch/common electrode is smaller than a size of the first touch/common electrode, and
a size of each of the first set of touch/common electrodes, the fourth touch/common electrode, the second set of touch/common electrodes, the third set of touch/common electrodes, and the fifth set of touch/common electrodes is identical with the size of the first touch/common electrode.

12. The touch sensor-integrated type display device of claim 10, wherein the second touch/common electrode, the fifth touch/common electrode, and the plurality of second group of touch/common electrodes have a same size.

13. The touch sensor-integrated type display device of claim 10, wherein the second touch/common electrode, the fifth touch/common electrode, and the fourth set of touch/common electrodes have identical same size.

14. The touch sensor-integrated type display device of claim 9, wherein during the display operation, the switching elements are turned off in response to a first control signal supplied through a control line to electrically disconnect the first outermost touch/common electrodes from the plurality of second group of touch/common electrodes, respectively, which are adjacent to each other, and
during the touch operation, the switching elements are turned on in response to a second control signal supplied through the control line to electrically connect the first outmost touch/common electrodes to the plurality of second group of touch/common electrodes, respectively, which are adjacent to each other.

15. The touch sensor-integrated type display device of claim 9, wherein the switching elements are disposed in the bezel area,
each of the switching elements includes a thin film transistor having a gate electrode, a semiconductor active layer disposed on a gate insulating layer, and a source electrode and a drain electrode separated from each other, and
the gate electrode is connected to the control line disposed on the gate insulating film in the bezel area.

16. The touch sensor-integrated type display device of claim 15, wherein each of the first outermost touch/common electrodes is electrically connected to each of the source electrodes of the switching elements, and
each of the second touch/common electrodes is electrically connected to each of the drain electrodes of the switching elements.

17. The touch sensor-integrated type display device of claim 9, wherein the plurality of second group of touch/common electrodes comprise a set of touch/common electrodes disposed in the bezel area to be adjacent to the first outermost touch/common electrodes.

* * * * *